J. G. BAKER.
BENCH VISE.
APPLICATION FILED AUG. 11, 1914.

1,176,019.

Patented Mar. 21, 1916.

Joseph G. Baker
Inventor

Witnesses
T. Williamson
H. W. Burton

By W. W. Williamson
Attorneys

UNITED STATES PATENT OFFICE.

JOSEPH G. BAKER, OF ALLENTOWN, PENNSYLVANIA, ASSIGNOR TO JOSEPH EDWARD DURHAM, OF PHILADELPHIA, PENNSYLVANIA.

BENCH-VISE.

1,176,019.   Specification of Letters Patent.   Patented Mar. 21, 1916.

Application filed August 11, 1914. Serial No. 856,160.

*To all whom it may concern:*

Be it known that I, JOSEPH G. BAKER, a citizen of the United States, residing at Allentown, in the county of Lehigh and State of Pennsylvania, have invented new and useful Improvements in Bench-Vises, of which the following is a specification.

My invention relates to new and useful improvements in bench vises, and has for its object to provide an exceedingly simple and effective construction, whereby the operating screw may be placed in the slide of the sliding jaw, and held therein without the insertion of pins, set screws or removable collars, and when so placed in position will have a certain amount of friction exerted thereon to prevent its too-free rotation.

A further object of my invention is to provide a swiveled shoe for the clamping screw of such a vise, which is made of a single piece and adapted to be swaged onto the ball end of the clamp screw in such a manner as to give it a free universal swiveled movement without liability of being displaced when pressure is brought to bear thereon.

With these ends in view this invention consists in the details of construction and combination of elements hereinafter set forth and specifically designated by the claims.

In order that those skilled in the art to which this invention appertains may understand how to make and use the same, I will describe its construction in detail, referring by numeral to the accompanying drawing forming a part of this specification, in which—

Figure 1:
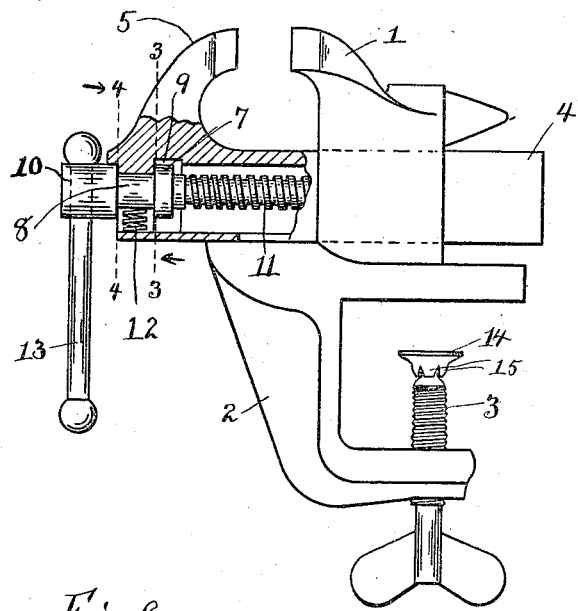
Figure 2:
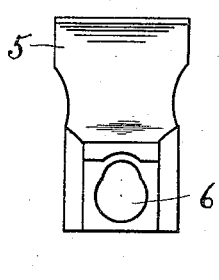
Figure 3:
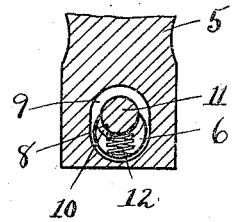
Figure 4:
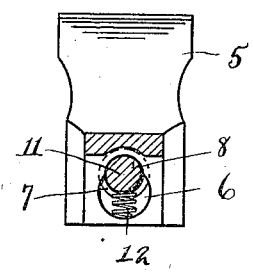
Figure 5:
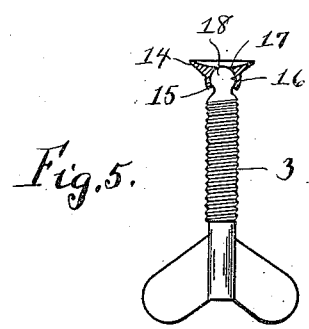
Figure 6:
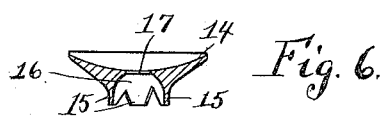
Figure 7:
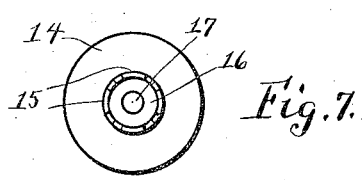

Figure 1, is a side elevation of one form of vise made in accordance with my improvement, a portion of the slide and sliding jaw being sectioned away so as to clearly illustrate the position of the operating screw therein. Fig. 2, is a front elevation of the sliding jaw, the operating screw being removed. Fig. 3, is a section at the line 3—3 of Fig. 1, looking in the direction of the arrow. Fig. 4, is a section at the line 4—4 of Fig. 1, looking in the direction of the arrow. Fig. 5, is an elevation of the clamp screw, the clamp shoe being sectioned to clearly show its position upon the ball end of said screw. Fig. 6, is an enlarged section of the clamp shoe showing the tangs thereof in position, before they are set upon the ball; and Fig. 7, is a bottom plan view of the clamp shoe.

In carrying out my invention as here embodied 1 represents a stationary jaw, which in the design here shown has formed therewith the clamp 2 for overlapping the edge of the bench, and 3 is the clamp screw threaded through the lower portion of the clamp for clamping the vise to the bench.

4 represents the slide which passes through the base of the stationary jaw in the ordinary manner, and has formed therewith the sliding jaw 5, all of which may be of ordinary or any suitable design. The slide is cast hollow and has formed in its front end the button hole slot 6, the lower portion of which is of sufficient size to permit the collar 7 to pass therethrough, while the upper portion thereof is of a diameter corresponding to the size of the bearing section 8 of the operating screw. Just back of the button hole slot is formed a recess 9 of sufficient size to receive the collar 7 without contacting with the side walls of said recess. The collar 7 as well as the head 10 are preferably formed integral with the operating screw 11, so that when said operating screw is placed in position within the slide and its jaw. there will be no tendency for either the collar or the head to become displaced. thus making an exceedingly simple and rigid construction.

In order that the operating screw may be held in place in the upper portion of the button hole slot against accidental displacement, a spring 12 is inserted beneath the bearing section 8 in such manner as to force this bearing section upward and hold it in the upper portion of the button hole slot. This spring has the further function of putting a certain amount of friction upon the operating screw which holds the latter against accidental rotation when the jaws are not clamped upon the work, which is very desirable especially in large bench vises, since the operating handle 13 when left at certain angles has a tendency to revolve the operating screw through a portion of a revolution, and unseat the vise which is entirely overcome by my invention. In practice I have found that this construction reduces the cost of manufacture of devices of this character, and gives much better results in the operation thereof.

The second object of my invention is accomplished by casting or drop forging the clamp shoe 14 with tangs 15 on the underside thereof, surrounding an approximately semi-spherical recess 16 which latter has an opening 17 through the upper wall thereof for the purpose hereinatfer set forth. The clamp screw 3 has formed on its upper end a ball 18 around which the tangs 15 of the clamp shoe are set in any well known manner, which arrangement will permit the shoe to have a limited universal swiveled movement so as to adjust itself to any unevennesses, when clamping the device to a wrench. The opening 17 provides convenient means for oiling this universal joint, and I prefer that the upper surface of the shoe should be concaved as clearly shown in Fig. 6, in order that the clamp shoe will bear upon the ball end thereof, thus increasing its hold upon the underside of the bench as will be readily understood. This form of clamp shoe will stand considerably more clamping strain than such used which are split and bent around the swiveled joint, since reasonable pressure will force the ball through the shoe of which there is a tendency in a split shoe.

Of course I do not wish to be limited to the exact details of construction as here shown, as these may be varied within the limits of the appended claims without departing from the spirit of my invention.

Having thus fully described my invention, what I claim as new and useful, is—

1. A vise comprising a slide, a sliding or adjustable jaw provided with a button hole slot mounted on said slide, an operating screw, a head on the outer end of said screw, a collar carried by said screw spaced from said head, thereby forming a bearing surface between said collar and head, said collar being of a size to pass through the larger portion of the button hole slot, while the bearing surface of the screw is of a size to fit the smaller portion of the button hole slot, and means engaging the operating screw and a portion of the vise for holding the bearing surface of the operating screw in the smaller portion of the button hole slot.

2. A vise comprising a slide, a sliding or adjustable jaw provided with a button hole slot mounted on said slide, an operating screw, a head on the outer end of said screw, a collar carried by said screw spaced from said head, thereby forming a bearing surface between said collar and head, said collar being of a size to pass through the larger portion of the button hole slot, while the bearing surface of the screw is of a size to fit the smaller portion of the button hole slot, and a coiled spring situated within the button hole slot and engaging the bearing surface of the operating screw to hold said bearing surface within the smaller portion of the button hole slot.

3. A vise comprising a slide, a jaw slidably mounted thereon, said jaw having a recess therein and a button hole slot in communication therewith, an operating screw provided with an integral head and collar spaced to form a bearing surface, said collar being of smaller diameter than the larger portion of the button hole slot, said operating screw adapted to be passed through the button hole slot until the bearing surface registers therewith and the collar enters the recess, and a spring within the button hole slot for holding the bearing surface in the smaller portion of the button hole slot.

In testimony whereof, I have hereunto affixed my signature in the presence of two subscribing witnesses.

JOSEPH G. BAKER.

Witnesses:
J. EDWD. DURHAM, Jr.,
M. A. REINSMITH.

Copies of this patent may be obtained for five cents each, by addressing the "Commissioner of Patents, Washington, D. C."